MAGNETIC TAPE TRANSPORT

Filed May 2, 1966 3 Sheets-Sheet 1

INVENTORS
PETER D. GEORGANTAS
RONALD E. LOOSEN
EDWARD S. KINNEY
Robert G. Clay
ATTORNEY

MAGNETIC TAPE TRANSPORT

Filed May 2, 1966 3 Sheets-Sheet 2

INVENTORS
PETER D. GEORGANTAS
RONALD E. LOOSEN
EDWARD S. KINNEY
Robert G. Clay
ATTORNEY April 30, 1968 P. D. GEORGANTAS ET AL 3,380,682

MAGNETIC TAPE TRANSPORT

Filed May 2, 1966 3 Sheets-Sheet 3

INVENTORS
PETER D. GEORGANTAS
RONALD E. LOOSEN
EDWARD S. KINNEY

Robert G. Clay
ATTORNEY 3,380,682

MAGNETIC TAPE TRANSPORT

Peter D. Georgantas, Playa Del Rey, and Ronald E. Loosen and Edward S. Kinney, Woodland Hills, Calif., assignors to Ampex Corporation, Redwood City, Calif., a corporation of California Filed May 2, 1966, Ser. No. 546,709
11 Claims. (Cl. 242—55.12)

ABSTRACT OF THE DISCLOSURE

A magnetic tape transport in which the tape passes between two parallel planes. The tape in one plane is driven by capstan means, passes between a pair of buffer means and across a magnetic head assembly. The tape is supplied on take-up and supply reels in the second plane with the path of the tape traversing between the two planes along relatively long lines outside the magnetic head region.

This invention relates to digital magnetic tape transports, and more particularly to extremely compact, high performance magnetic tape transport systems, and such systems when particularly adapted for cartridge loading.

Digital magnetic tape transports are required to drive a magnetic tape intermittently, bi-directionally and with extremely short start-stop times. It is not generally practical or economical to attempt to drive high inertia reel mechanisms in this fashion, so the start and stop movements and the constant speed mode are generally controlled by a precision capstan arrangement. Disparities between the capstan and reel drive are accounted for by buffer mechanisms, such as multiple loop tension arms or, more commonly, vacuum chambers. A vacuum chamber, for example, forms a loop of tape having low inertia to permit rapid changes of loop length between the high acceleration rate capstan and the low acceleration rate reels. Many systems based upon this general configuration have been adopted. Most of the earlier systems have been based upon the use of contra-rotating capstans, together with actuable pinch rollers, or vacuum or pneumatic arrangements for suddenly urging the tape against a selected one of the capstans. More recent systems have substantially reduced the complexity formerly involved, but have also substantially improved tape life and tape guiding. These more recent systems maintain the tape constantly in contact with a capstan that is itself directly accelerated, driven at a selected constant speed, and decelerated by a high torque to inertia motor under electronic control. In such a system, the tape is disposed in a balanced tension, low friction path with a substantial wrap angle about the capstan arrangement, which may be either a single or a double capstan. The combination of direct drive and electronic control, without binding forces acting on the tape, provides material advantages in terms of wear, tape guiding and reliability, as well as in cost and simplicity.

In order for such systems to operate under high performance conditions, a relatively high wrap angle, of the order of 180°, must generally be used in relation to the capstan. The low friction and balanced tension arrangement must also be maintained. These performance requirements present substantial problems when it is desired to make a compact, portable and cartridge loaded tape transport system for general use. The high wrap-around angle generally requires a somewhat tortuous path about a single capstan. A tortuous tape path is not readily compatible either with compactness or with cartridge loading. The presence of vacuum chambers materially increases the dimensions within which the system must be contained. The increase in dimensions is most noticeable in conventional configurations in which the tape reels are in the plane of the vacuum chambers and the capstan. On the other hand, the arrangement of the tape path relative to the capstan system in the direct drive type of system should provide substantially balanced tension and uniform friction, so that a degree of symmetry must be maintained. This requirement militates against the use of conventional dual plane or multi-plane arrangements, such as concentric reel records in which the tape is twisted out of one plane into another in the region of the head assembly. Such conventional arrangements are further not well adapted to digital tape transport applications, particularly those using vacuum chambers.

It is therefore an object of the present invention to provide an improved, extremely compact, digital magnetic tape transport.

Another object of the present invention is to provide an improved digital magnetic tape transport, suitable for use with an electronically controlled direct capstan drive, where the configuration provides an extremely compact and lightweight transport.

Another object of the present invention is to provide an improved compact tape transport configuration suitable for use with cartridge loading if desired.

These and other objects are achieved by a system in accordance with the invention that provides a dual plane arrangement for the tape. The magnetic tape passes in one plane between a pair of vacuum chambers, and across dual, directly driven capstans separated by a space in which is disposed the magnetic head assembly. A line drawn across the open ends of the vacuum chambers is almost tangential to the capstan surfaces and the magnetic head assembly, and this arrangement greatly facilitates threading of the tape. The tape reels lie in a different plane superimposed above and parallel to the first, and the path of the magnetic tape traverses between the two planes along relatively long lines including the side of the transport mechanism. The path from the first plane to the second plane is substantially normal to the path in the tape threading region, with lateral guiding being provided by corner guides about which the tape is turned. Thus the translation of the tape between the two planes is in each instance made outside the magnetic head region. Decoupling is provided by the vacuum chambers, and by the control exercised by the guiding mechanisms between each of the vacuum chambers and its respective reel. The width and length of this tape transport system, viewed in plan, is not substantially greater than the dimensions required for the two reels to lie adjacent one another in the superimposed plane.

An important feature of this arrangement is the ease and facility with which the arrangement may be used in a cartridge loading combination. Cartridge loading requires proper feeding of the tape across the capstan and vacuum chambers, as well as against the magnetic head assembly with a minimum of adjustment by the operator. In cartridge load systems in accordance with the invention, the cartridge mechanism is provided with tape guiding elements for maintaining the tape in the first plane, as well as the translational guiding required between the first plane and the superimposed plane. The tape reels are supported in the cartridge mechanism in a fashion to permit rotation on the reel hubs which extend through the first plane and engage the reel centers when the cartridge is moved into operative position.

A better understanding of the invention may be had by reference to the following description, taken in conjunction with the accompanying drawings, in which.

Figure 1:
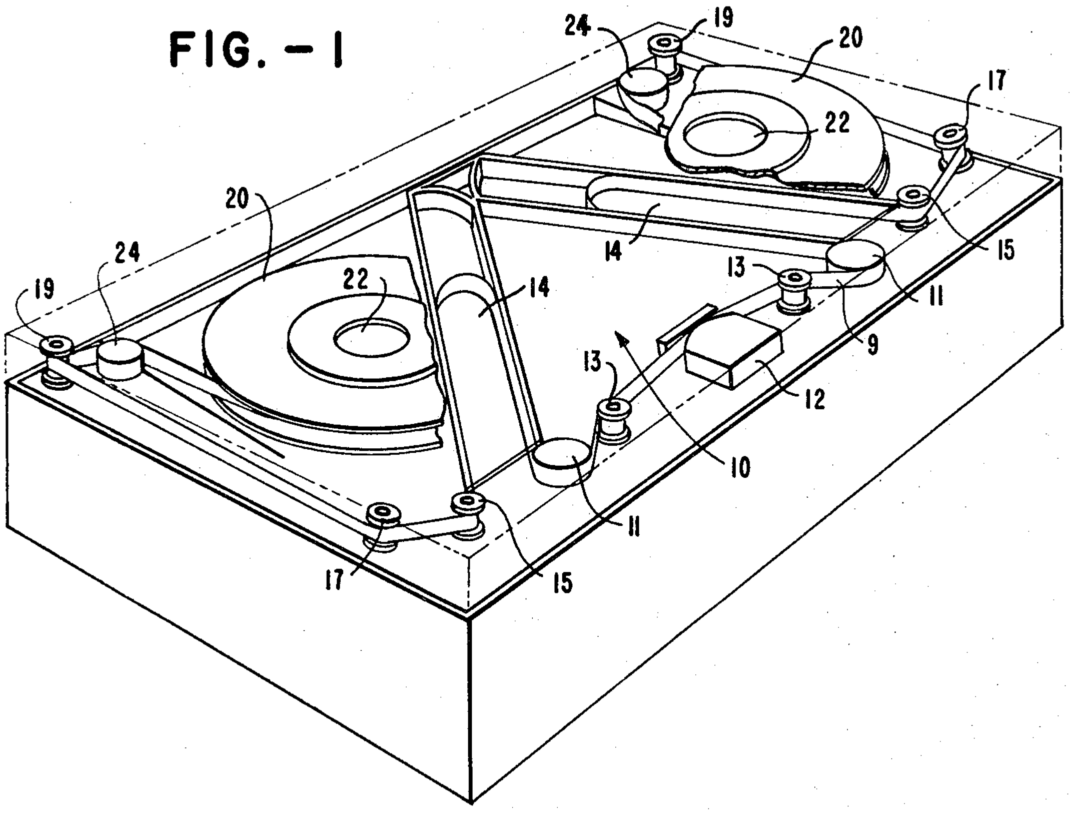
FIGURE 1 is a perspective view, partially broken away, of a system in accordance with the invention.
Figure 2:
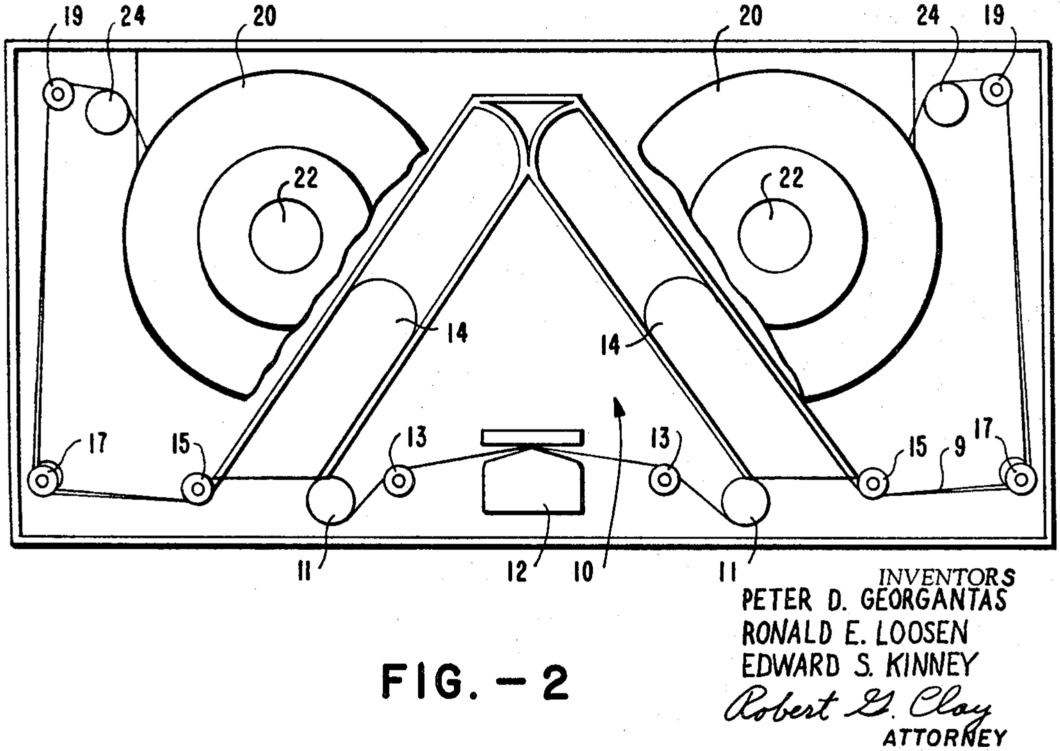
FIGURE 2 is a plan view of the arrangement of FIG. 1.

In FIGS. 1 to 4, a tape transport is shown as used in conjunction with a typical tape transport system having a front panel 10, upon which the operative components (not shown) are mounted below a pivoted cover (shown diagrammatically only). The reel servo motors for driving the tape reels are typically mounted on the opposite side of the panel 10, along with the associated power drive circuitry and data electronics, none of which are shown for simplicity. In the present example, the system is shown mounted horizontally.

The principal operative path for a tape 9 passes along one long edge of the panel 10 in a first predetermined plane adjacent but at right angles to the panel surface. The high speed start-stop system for driving the tape along the operative path comprises a pair of capstans 11 driven together in a controlled relationship. The capstans are preferably driven by a bi-directional drive motor (not shown) arrangement, such as to provide a drive system having a high torque to inertia ratio, through a flexible belt. Between the capstans 11, the tape 9 passes across a magnetic head assembly 12 containing separate or combined write and read transducers, as desired. A pair of low friction roller guides 13 are disposed on opposite sides of the head assembly 12, to provide lateral guiding of the tape 9. The roller guides 13 are positioned to maintain a slight angularity (viewed in plan) in the path of the tape 9 across the head assembly 12, so as to maintain good head-to-tape contact while improving tape guiding in the head region. The guides 13 are not, however, necessary and may be omitted for many applications. Adjacent each of the capstans 11, the tape 9 enters different vacuum chambers 14, each chamber 14 essentially being rectangular and forming a tape loop in conventional fashion. The two chambers 14 are arranged in a V configuration, with the closed ends together and the open ends lying along the principal tape path. The capstans 11 are disposed between the open ends of the chambers 14, and the wrap angle is defined by the angle between the principal path and the vacuum chamber side.

In systems in accordance with this invention, desirable advantages are obtained for the direct drive type of digital tape transport system and for digital tape transports in general. The only sliding frictional contact against oxide surface on the tape 9 in the principal operative region is that introduced by the magnetic head assembly. The roller guides 13 provide minimal sliding contact and may, as noted above, be omitted. The mechanical forces acting on the tape are balanced for each direction of operation, so that operational forces on the tape remain constant during bi-directional operation. The flexible belt arrangement driving the capstans may be arranged to provide a differential tension effect, so that the tape 9 in the magnetic head region is always maintained under a controlled low tension. A low tension in this region insures the best contact with the transducer gaps in the head assembly. Because a line approximately tangent to the head assembly 12 and the exterior surfaces of the capstans 11 passes adjacent the open ends of the chambers 14, the tape may be readily threaded.

The inertia represented by the short length of tape 9 between the capstans 11 is basically the only mass to be overcome in accelerating and decelerating the tape, apart from minor frictional forces. The tensions exerted by the two vacuum chambers 14 remain equal, irrespective of the length of the tape loops within the chambers, thereby eliminating the masses of tape in the two chambers with respect to the dynamics of the system. Under these conditions, the total wrap-around angle of the tape 9 relative to both capstans 11, determined on a cumulative basis, principally establishes the total frictional restraint exerted on the tape by the capstan system. The tape tension has some additional effect, but it may be shown that the wrap-around angle is the primary controlling factor. With appropriate tape tension and a total wrap-around angle in excess of 180°, the tape 9 is maintained in constant, non-sliding contact with the capstans 11 and moves in fixed relation to the capstans as they are started, driven at constant speed in either direction, and stopped or reversed.

These advantages are further augmented by the compactness of the system. The tape path is continued along the essentially linear path defined in the principal operative region, except for the loops extending into the vacuum chambers 14, which loops are formed after threading. At the exit end of each chamber, the tape 9 is turned around a low inertial roller guide 15 having shoulders for edge guiding the tape. At opposing front corners (as seen in FIG. 1) of the panel 10, the tape is again turned about fixed or roller guides 17 (here of the roller guide type), also having restraining shoulders for laterally guiding the tape. These roller guides 17 may be disposed along the line of the principal operative tape path, or slightly displaced as shown. The tape 9 then translates from the first plane to the second or superimposed plane over relatively long paths extending along each of the side edges of the panel 10 and substantially normal to the principal operative path. These translational paths are defined by the guides 17 and additional roller guides 19 having lateral restraining guide edges, and disposed adjacent the rear corners (as seen in FIG. 1) of the panel 10. The two guides 17, 19 at the ends of the translational path are slightly slanted relative to an axis normal to the horizontal panel 10. The slant of the guides 17, 19 approximately bisects the angular difference between the principal tape path line in the first or second plane and the translational tape path line. Because of the length of the translational paths along the side edges of the panel 10, the angle they define relative to the first and second planes is low.

Each of the tape reels 20 is mounted in the second plane, overlapping or superimposed upon the vacuum chambers 14. In the present instance, the base of the V configuration defined by the chambers 14 is disposed on the side of the mechanism away from the magnetic head assembly 12. The reel hubs 22 are mounted concentric with spaced apart central axes that are disposed outside of the V defined by the chambers 14. It will be recognized, however, that the vacuum chambers 14 can be disposed along lines normal to the principal tape path, in which form the reel hubs 22 may be disposed between the two vacuum chambers 14. It will be noted that with the present configuration the two reels, such as standard 10½ inch computer reels, are only slightly separated and that the path of the tape 9 along each of the side edges is only slightly separated from the reels 20 on the outer edges of the arrangement. Thus the total required working area, as shown in the plan view of FIG. 2, necessitates only an outer margin extending slightly beyond a rectangle encompassing the reels 20 and the magnetic head assembly 12. The configuration illustrated provides adequate vacuum chamber length for most applications. If it is desired, however, to compact the arrangement further by reducing the vacuum chamber length, it will be appreciated that all elements in the first principal operative plane, adjacent the panel 10 itself, can be disposed under the rectangular area bordered by the outer edges of the reels 20.

In the second plane, the tape 9 passes between the corner guide rollers 19 and the reels 20, about rollers 24 shown as rubber surfaced tachometer drive wheels, with the tachometers (not shown) generating signals used in the reel servo system. In the exemplification of FIGS. 1–4, the system is not intended to be cartridge loaded, and a conventional reel hub 22 and hold down mechanism, such as a tightening knob with a conventional internal locking mechanism, may be utilized.

Thus it will be appreciated that, in the buffer storage area and in the region of the magnetic head assembly 12, the tape path is maintained in a single plane. Symmetrical forces act upon the tape in the operative area irrespective of the direction the tape is driven. The vacuum chambers 14 provide mechanical isolation of the capstan system from the reels 20 and from the translational paths. The loops formed within the vacuum chambers 14 effectively eliminate any tendency to lateral skew introduced by virtue of the translation from the superimposed plane to the principal operative plane. The translation is therefore made in the least critical tape tracking area and in a gradual fashion so that no disturbing effects are encountered in the tape pack as the tape is wound onto either reel. Outside the vacuum chambers 14, the tape may be turned twice through approximately 90° angles, to provide a compact system.

Figures 3, 5:
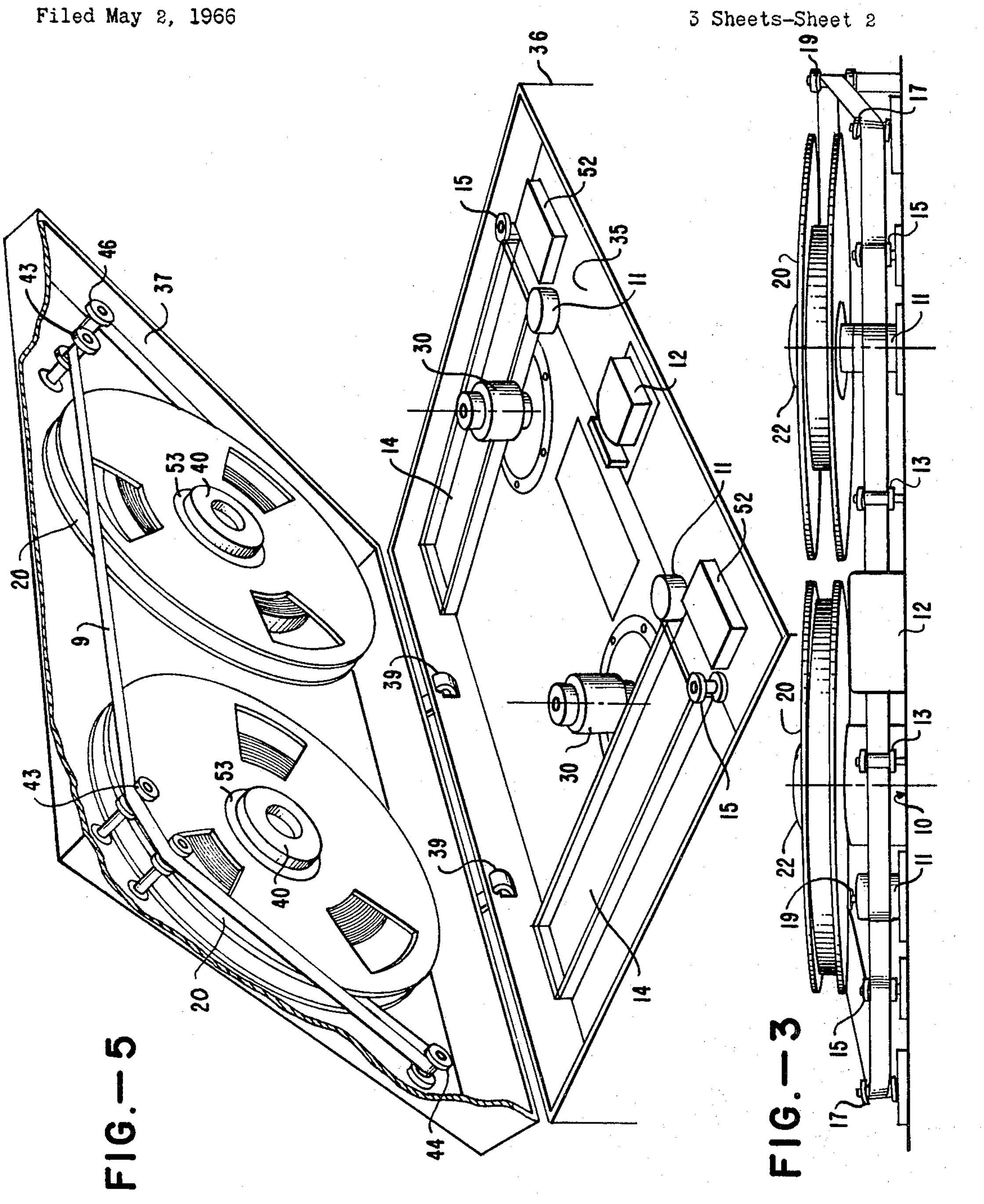
FIGURE 3 is a front perspective view of the arrangement of FIG. 1.
FIGURE 5 is a perspective view, partially broken away, of a cartridge loading arrangement in accordance with the invention, showing the cartridge prior to entry into operative position.
Figure 4:
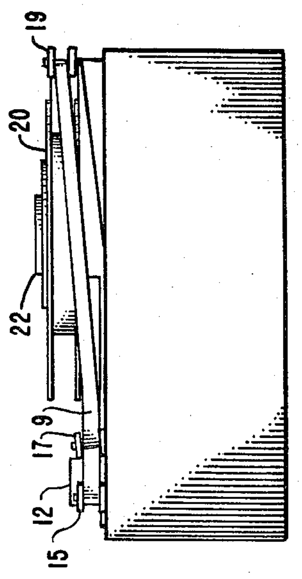
FIGURE 4 is a partial side view of the arrangement of FIG. 1.
Figure 6:
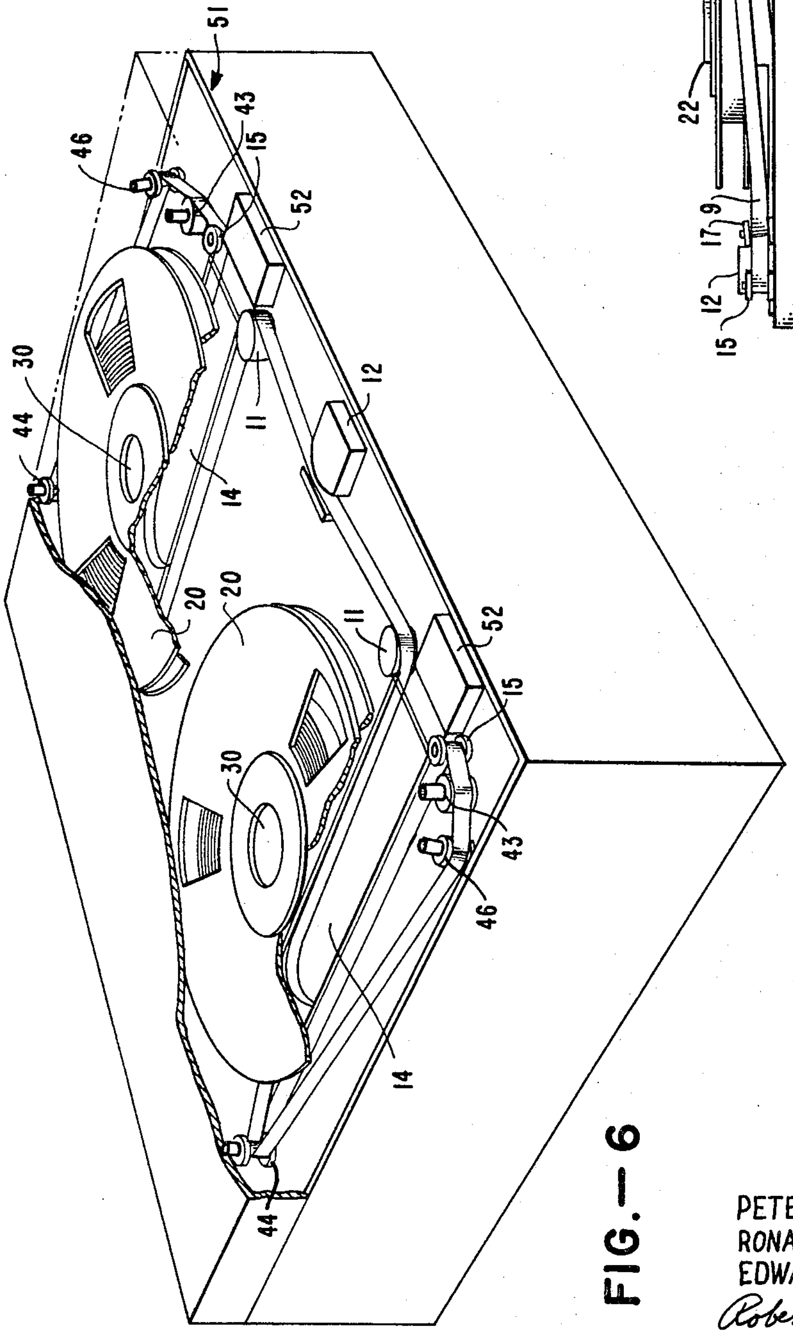
FIGURE 6 is a perspective view, partially broken away, showing the mechanism of FIG. 5 after the cartridge has been entered into position and the tape threaded in the chambers.

The arrangement of FIGS. 5 and 6 illustrates the cartridge load type of system, with only a limited number of changes being made in the mechanism. By way of example, the chambers 14 are shown as disposed normal to the principal operative tape path with the reel hubs 30 being disposed between the chambers 14. A top panel 35 is disposed within a housing 36 illustrated only generally but similar to that of FIG. 1. The cartridge 37 constitutes a cover section for the housing and a support member for the tape reels. The cartridge 37 includes conventional pivot mechanisms 39 of the type that may be readily coupled to or detached from the back wall (as seen in FIG. 5) of the housing 36, and by means of which the assembly may be closed. The assembly may of course be mounted in any convenient relative position.

The cartridge load system uses the double capstan 11 arrangement, with the tape 9 passing therebetween along a substantially linear path extending also across the magnetic head assembly 12. The tape guiding elements with the exception of the capstans 11 and guides at the vacuum chambers 14 are mounted on the interior portion of a cover comprising the removable tape cartridge 37. The cartridge 37 is positioned to be superimposed on the system when in operative position. Each reel 20 is removably mounted on low friction bearings 53 to the interior surface of the cover 37. These bearings 53, not shown in detail, may be of any suitable type permitting free rotation of the reels 22 relative to the cartridge 37. If conventional reels 20 are used, as shown, an internal adapter member 40 in the form of an internal toroid may be used having inner and outer peripheries mated to the reel 20 and hub 30. This adapter member 40 may if desired contain elements such as splines (not shown) for gripping the associated reel hub 30 when the cartridge 37 is closed, but permitting release when the cartridge 37 is opened. Alternatively, the reel hubs 30 may be designed for an automatic locking action. In the present example, the reel hubs 30 are mounted individually concentric with two spaced apart axes adjacent the chambers 14 and separated from the head assembly 12, and the reels 20 have corresponding spacings and positions. The corner guide posts for the first and second planes of the tape 9 are each appropriately disposed on the under surface of the cartridge 37, providing the equivalent tape path to the arrangement of FIGS. 1 to 4. The cartridge 37 and top panel 35 define a substantially rectangular interior chamber when the cartridge 37 is closed.

Roller guides 43 at opposite corners of the cartridge 37 define the principal tape path and permit straight line threading of the tape 9 across the capstans 11, chambers 14 and magnetic head assembly 12. Note that the open ends of the chambers 14 lie along a predetermined tape path defined by the capstans 11 and the intermediate head assemby 12, and that the tape path between the roller guides 43 corresponds when the cartridge 37 is closed. Similar guides 44 are employed in the rear corners of the cartridge 37, to define the opposite end of the translational path. Intermediate guides 46 are employed in this instance to take the translational tape paths outside the periphery of the reels 20. All three guides 43, 44 and 46 on each side of the cartridge 37 provide lateral guiding and are at chosen slant angles relative to the operative planes, to provide controlled translation of the tape between the two planes of movement. These angles bisect the difference in angle between the first or second plane and the translational plane.

In the operation of the arrangement of FIGS. 5 and 6, an operator selects a desired cartridge 37 from storage, with the reels and tape being disposed as shown in FIG. 5. A bottom plate (not shown) for the cartridge 37 may be utilized if desired, and may be removed or configured with openings to mesh between the cartridge 37 and the mounted elements when the cartridge is closed onto the panel. For maintaining the tape 9 under tension when the cartridge 37 is used for storage, the reel holders may include spring biasing means (not shown) which are automatically disengaged when the cover cartridge is entered into operative position.

When the cartridge 37 is in operative position, a differential pressure is exerted on the tape 9 by each chamber 14, causing the formation of a loop in each chamber 14. In the present instance, a positive pressure, instead of vacuum, system is shown. Headers 52 are disposed across the open ends of the chambers 14, and differential pressure across the tape 9 is established by air directed into the chamber from a header 52 and passing out a conventional outlet in the chamber 14. The control system energizes the reel motors to provide the requisite tape supply until desired loop length limits are attained in the chambers. Thereafter, the system may move the tape 9 to a starting position, and ordinary data transfer operations may be carried out. Such arrangements are conventional with digital magnetic tape transport systems, and accordingly have not been shown in detail.

While there have been described above and illustrated in the drawings various forms of digital magnetic tape transports in accordance with the invention, it will be appreciated that the invention is not limited thereto but encompasses all modifications and variations falling within the scope of the appended claims.

What is claimed is:

1. A tape transport system for digital applications comprising a pair of tape loop chamber means having spaced apart open ends and disposed in a first plane, a pair of spaced apart tape reels disposed in a second plane adjacent and parallel to the first plane, a pair of bi-directionally rotatable capstan means disposed at least partially between the open ends of said chamber means, and guide means disposed at least partially on the opposite sides of said chamber means from the capstan means for guiding the tape between the first and second planes.

2. The invention as set forth in claim 1 above, wherein the tape reels in the second plane are superimposed on the chamber means in the first plane, and wherein the guide means comprise roller elements providing lateral restraint of the tape along translational paths between the first and second planes.

3. The invention as set forth in claim 2 above, wherein the roller elements in the translational plane are slanted relative to the first and second planes to provide controlled angles in the tape path, and wherein the translational paths are at relatively low angles to the first and second paths.

4. A tape transport and recording system comprising, in combination: a principal operative plane; a pair of spaced apart reel means for storing a source of tape in a second plane substantially parallel with said operative plane; a recording head assembly; means for bi-directionally moving said tape in the operative plane past said recording head assembly; means for forming a buffer loop of tape between said moving means and each of said reel means; and means including a plurality of guide members for translation of said tape from said second plane to said operative plane and returning said tape to said second plane.

5. A tape transport system for use with a recording head assembly mounted in a first plane, comprising: reel means for storing a source of tape, said reel means being mounted in a second plane parallel to and juxtaposed adjacent the first plane containing the recording head assembly; driving means for bi-directionally moving said tape past said recording head assembly; said driving means comprising capstan elements in said first plane; means comprising vacuum chambers for forming buffer loops of tape between said driving means and said reel means, means including a plurality of guide means for feeding the tape to said reel means at the side of the reel away from said head assembly and translating the tape betwen said second plane and said first plane while the tape traverses at substantially right angles to the movement of the tape past said head assembly.

6. A digital tape transport system for use with a magnetic head assembly disposed in a first plane, comprising: a pair of reel means for storing a source of tape, said reel means being located in a second plane parallel to and juxtaposed adjacent the first plane containing the recording head; drive means disposed in said first plane for bi-directionally moving said tape past said head assembly; said drive means comprising capstan means, means comprising a pair of vacuum chambers each having one open end, said vacuum chambers being positioned with respect to said capstan means and said head assembly to provide approximately 180° of tape wrap on said capstan means, a line approximately tangent to said head assembly and the exterior surfaces of said capstan means passing adjacent the open ends of said vacuum chambers, means including a plurality of guide means disposed between said vacuum chambers and reel means on the side away from said head assembly and translating the tape between said first plane and second plane in regions spaced apart from said vacuum chambers, and in directions substantially normal to the path of the tape across said head assembly.

7. The invention as set forth in claim 6 above, wherein the vacuum chambers are disposed in a V configuration, and wherein said plurality of guide means provide two turns in the tape of at least approximately 90° between each vacuum chamber and its associated reel means, and further provide lateral restraint of the tape.

8. A tape transport cartridge system for use with high speed digital tape recorders including magnetic head assembly means, means for forming buffer loops of said tape, and means for driving tape, all disposed in a first plane, said cartridge comprising a support member, reel means for supplying and taking up tape, said reel means being mounted in a second plane on said support member, said second plane being substantially parallel to said first plane and at a predetermined distance therefrom; means including first guide means coupled to said support member and operable for guiding said tape in said first plane, second guide means coupled to said support member and operable for guiding said tape in said second plane, said first guide means being adjacent said reel means and spaced apart from said magnetic head assembly means, said first guide means lying substantially along a line passing approximately across said head assembly means and said drive means whereby said tape is bi-directionally movable past said head and between said first and second planes.

9. A cartridge load digital tape transport system for a system including a magnetic head assembly disposed in a first plane and comprising a support panel member and a cover support member, means pivotally coupling said cover member to said panel member to permit said cover member to close on said panel member, said cover member and panel member thereupon defining a substantially rectangular interior chamber; means defining a pair of tape reel support means extending into a second plane and mounted in said panel member, said first and second planes being substantially parallel with said first plane being closer to said panel member than said second plane; tape driving means including a pair of spaced apart capstans disposed along a predetermined path on said panel member in the first plane; magnetic head assembly means mounted on said panel member along said predetermined path between said capstans; tape reel means mounted on said cover member concentrically about positions corresponding to said reel support means when said cover is closed, such that said reels seat upon said reel support means, said reel means being mounted in said second plane; and a plurality of tape guiding means mounted on said cover member and extending therefrom towards said panel member and defining a tape path extending from said reel means in said second plane to said predetermined path in said first plane when said cover member is closed, said guide means providing lateral guiding of the tape.

10. A digital magnetic tape transport having particular compactness and comprising: a rectangular planar panel member for supporting operative members; a pair of bi-directionally rotatable capstans approximately adjacent one edge of the panel member and defining a substantially linear predetermined path for the tape, said predetermined path lying in a first plane adjacent said panel member; a magnetic head assembly disposed in operative engagement with the tape in said first plane and along said predetermined path between said capstans; a first pair of roller guides providing lateral guiding of the tape and lying in said first plane between said head assembly means and each of said different capstans; a pair of vacuum chambers each having an open end and a closed end and disposed in a V configuration in said first plane, with the closed ends lying approximately adjacent each other and the open ends each lying adjacent a different capstan and approximately aligned with said predetermined path; a pair of reel hub means, each mounted adjacent a different outer side of the V configuration of vacuum chambers in said first plane and extending into a second plane further spaced from said panel member than said first plane; at least a second pair of roller guide means each disposed adjacent a different one of said vacuum chambers in said first plane on the opposite side of a different vacuum chamber from the associated capstan, said second pair of roller guide means providing lateral guiding of the tape; at least a third pair of roller guide means providing lateral guiding of the tape and each spaced apart from a different one of said second roller guide means and mounted on said panel member in a corner of said panel member on the side opposite from said predetermined path, said third roller guide means lying in said second plane; said second and third roller guide means each being angled at a relatively low angle relative to a direction normal to said panel member to provide a controlled translation path between said given and predetermined planes; and a pair of tape reel means, each mounted on a different one of said reel engaging means in said predetermined plane and providing tape to the tape path.

11. A cartridge loaded digital magnetic tape transport system comprising: tape driving means including a pair of bi-directionally operable capstans disposed along a substantially linear path in a first plane; a pair of means for forming buffer loops of the tape disposed adjacent to and in the plane of said capstans; magnetic head means disposed along the substantially linear tape path in the first plane; tape cartridge means comprising a support member adapted to be superimposed in an operative position over said driving means, and including in said operative position tape supply and take-up means coupled thereto and disposed in another plane parallel to the first, and tape guiding means translating the tape between the two planes, and providing a tape path between said supply and take-up means and the substantially linear tape path.

References Cited

UNITED STATES PATENTS

| | | | |
|---|---|---|---|
| 3,033,480 | 5/1962 | Parzen | 242—55.12 |
| 3,083,925 | 4/1963 | Schoebel | 242—55.13 |
| 3,111,281 | 11/1963 | Sinkewitsch | 242—55.13 |
| 3,263,936 | 8/1966 | Williams | 242—55.13 |

LEONARD D. CHRISTIAN, *Primary Examiner.*